United States Patent [19]
Kohn

[11] Patent Number: 5,101,484
[45] Date of Patent: Mar. 31, 1992

[54] METHOD AND APPARATUS FOR IMPLEMENTING AN ITERATIVE PROGRAM LOOP BY COMPARING THE LOOP DECREMENT WITH THE LOOP VALUE

[75] Inventor: Leslie D. Kohn, San Jose, Calif.

[73] Assignee: Intel Corporation, Santa Clara, Calif.

[21] Appl. No.: 311,295

[22] Filed: Feb. 14, 1989

[51] Int. Cl.$^5$ .............................................. G06F 9/00
[52] U.S. Cl. .............................. 395/375; 364/DIG. 1; 364/262; 364/262.1; 364/262.3
[58] Field of Search ... 364/200 MS File, 900 MS File

[56] References Cited

U.S. PATENT DOCUMENTS

| | | | |
|---|---|---|---|
| 4,462,074 | 7/1984 | Linde | 364/200 |
| 4,463,422 | 7/1984 | Storer et al. | 364/200 |
| 4,652,997 | 3/1987 | Kloker | 364/200 |
| 4,727,483 | 2/1988 | Saxe | 364/200 |
| 4,792,892 | 12/1988 | Mary et al. | 364/200 |
| 4,882,701 | 11/1989 | Ishii | 364/200 |
| 4,910,664 | 3/1990 | Afizono | 364/200 |

Primary Examiner—Thomas C. Lee
Assistant Examiner—Richard Lee Ellis
Attorney, Agent, or Firm—Blakely, Sokoloff, Taylor & Zafman

[57] ABSTRACT

A method and apparatus for providing program loop control in a data processor employs a special purpose instruction that substantially reduces the program overhead associated with conditional branching at the end of a program loop. The instruction first compares a loop counter with a decrement value. If the loop counter has counted down, a loop condition code, which is stored in a dedicated register bit, is cleared. Otherwise, the loop condition code remains set to indicate that further iterations of the loop are required. The decremented value of the loop counter is then stored in a loop counter register. In parallel with decrementing of the loop counter, a conditional branch is executed based on the value of the loop condition code set in the immediately previous iteration of the loop. If the loop condition code is cleared, i.e. if the loop has been completed, program control proceeds to the instruction following the loop after execution of the next instruction in sequence. conversely, if the loop condition code is set, program control returns to the branch address, i.e. the beginning of the loop, after execution of the next instruction in sequence. All of the operations of the present invention are performed within a single instruction cycle.

7 Claims, 3 Drawing Sheets

METHOD AND APPARATUS FOR IMPLEMENTING AN ITERATIVE PROGRAM LOOP BY COMPARING THE LOOP DECREMENT WITH THE LOOP VALUE

FIELD OF THE INVENTION

This invention relates to the field of data processing. More particularly, it relates to a method and apparatus for conditional branching to effect program loop control with a minimum amount of program overhead.

BACKGROUND ART

Nearly all data processing applications involve operations that must be iteratively performed on sets of data. Such program loops may include any number of instructions and may be iterated any number of times as established by the computer program. In order to effectuate such program loops, it is generally necessary to have some means for counting the number of iterations that have been performed and to perform a conditional branch at the end of the loop based on the value count. If the count has reached a predetermined terminal value, the loop is exited and program control passes to the next instruction following the loop or to some other specified instruction location. If the count has not reached the predetermined terminal value, program control returns to the beginning of the loop in order to reiterate the instructions in the loop. At some convenient point in the loop, the count is incremented. Certain data processing systems implement an instruction that concurrently increments (or decrements) the count and tests the value of the count.

Prior art data processing systems require a minimum of two or three clocks to maintain and test a loop counter and to perform conditional branching. This imposes a significant execution overhead, particularly if a large number of relatively short loops must be performed. Thus, one way to increase the operational throughput of a data processing system is to reduce the amount of program overhead associated with conditional branching at the end of a program loop.

SUMMARY OF THE INVENTION

The present invention is directed to a method and apparatus for providing program loop control in a data processor. A special purpose instruction is provided that substantially reduces the program overhead associated with conditional branching at the end of a program loop.

The instruction provided by the present invention accomplishes, within a single instruction cycle, conditional branching operations that are functionally equivalent to operations which typically require two or three instruction cycles in prior art processors. The instruction described herein, which is conveniently referred to as a brance and add instruction, first compares a loop counter with a decrement value. If the loop counter has counted down, a loop condition code is cleared. Otherwise, the loop condition code reamins set to indicate that further iterations of the loop are required. The decremented value of the loop counter is then stored in the loop counter register. In parallel with decrementing of the loop counter register, a conditional branch is executed based on the value of the loop condition code set in the previous iteration of the loop (or during initialization in the case of the first pass through the loop). If the loop condition code is cleared, i.e. if the loop has been completed, program control proceeds to the instruction following the loop after execution of the next instruction in sequence. Conversely, if the condition code is set, program control returns to the branch address, i.e. the beginning of the loop, after execution of the next instruction in sequence. All of the operations of the present invention are performed within a single instruction cycle.

NOTATION AND NOMENCLATURE

Figure 1:
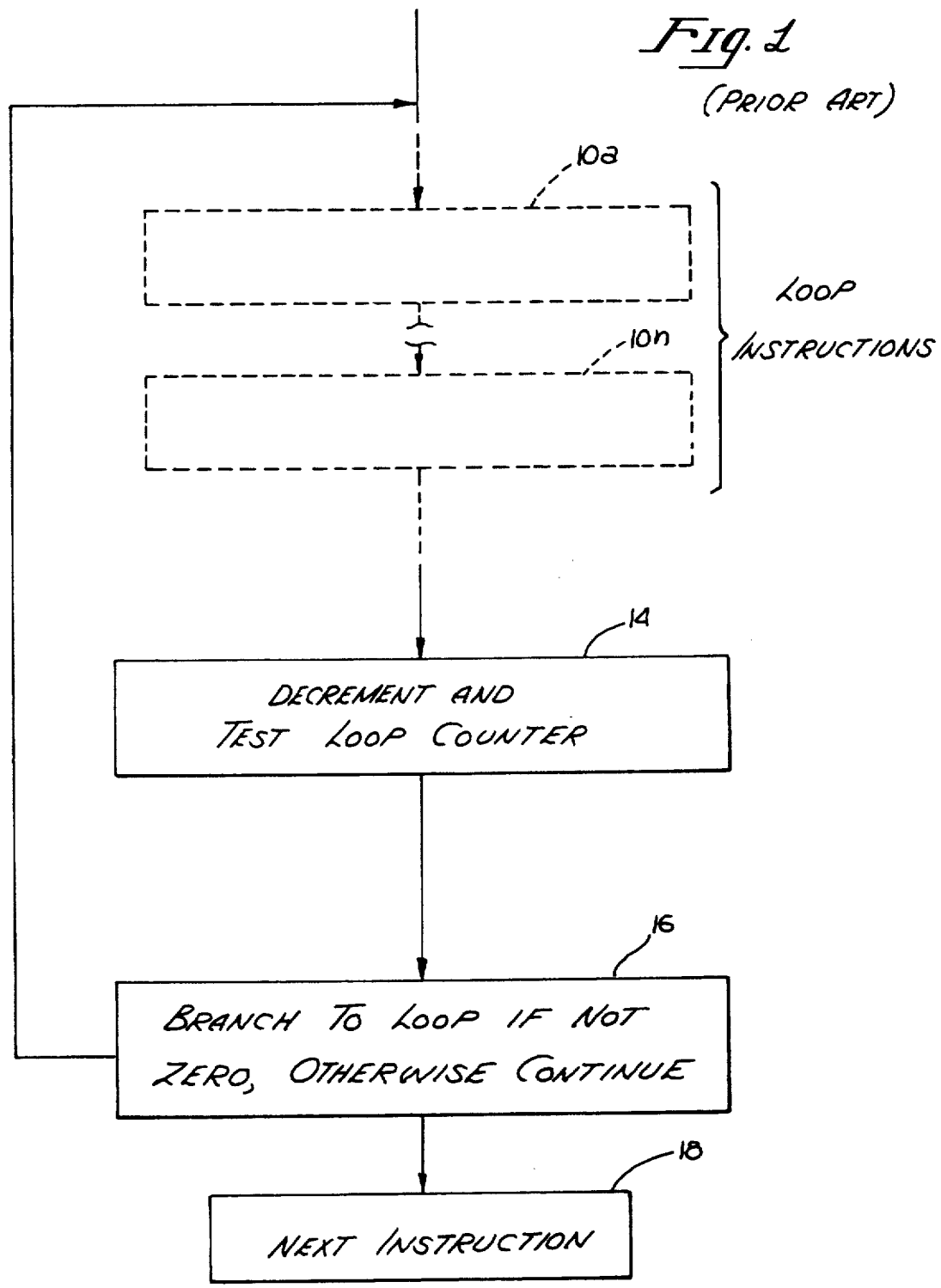
FIG. 1 is a logical flow diagram of a prior art sequence of instructions for performing program loop control.

The detailed description which follows is presented largely in terms of algorithms and symbolic representations of operations on data bits within a computational device. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities. Further, the manipulations performed are also referred to in terms, such as adding or comparing, which are commonly associated with mental operations performed by a human operator. No such capability of a human operator is necessary, or desirable in most cases, in any of the operations described herin which form part of the present invention; the operations are machine operations. While the present invention is most advantageously applied in a microprocessor, other useful manchines for performing the operations of the present invention may include general purpose digital computers and similar devices. In all cases, the distinction between the method operations and operationg a computer and the method of computation inself should be noted. The present invention relates, in part, to method steps for operating the processor and thereby process electrical signals to generate other desired electrical signals.

DETAILED DESCRIPTION OF THE INVENTION

In the following description, for purposes of explanation and not limitation, specific data representations, bit assignments, sequences of operations, etc. are set forth in order to provide a thorough understanding of the present invention. However, it will be apparent to one skilled in the art that the present invention may be practiced without these specific details. In other instances detailed descriptions of well known graphic processing hardware techniques and algorithms are omitted so as not to obscure the present invention.

The method steps of the present invention are conveniently described and implemented as an instruction executed in a microprocessor. In a preferred embodiment the processor operates on 32-bit data words. The instruction described herein operates on two data words obtained from addressable integer registers. The input of source operands are generally as src1 and src2. The instruction likewise returns results to an addressable integer register destination. In a preferred embodiment, a register file comprising a set of addressable registers is provided for all input and result operands. Data from the designated source registers are transferred into temporary registers, the contents of which are then supplied to an arithmetic logic unit (ALU). The result of the operation is loaded into a temporary register, and from there is returned to the designated destination register in the register file.

Referring first to FIG. 1, a prior art method for performing end of loop branching is shown. A sequence of loop instructions is designated as 10a-10n. Following the last instuction 10n in the loop, a loop counter is decremented and tested at step 14. The subsequent step 16 performs a conditional branch based upon the results of the test performed in step 14. If the new value of the loop counter is greater than zero, the program branches to the top of the loop at step 10a. If the new value of the counter is equal to zero (or some other specified value), the loop has been completed and the program continues to the next instruction in sequence at step 18.

In the prior art as illustrated in FIG. 1, at least two instructions or two clocks (i.e. steps 14 and 16) must be executed at the end of each pass through the loop in order to perform the conditional branch function. In cases where there are relatively few instructions in the loop requiring a relatively large number of iterations, the overhead associated with the conditional branch function significantly reduces the instruction throughput.

The present invention performs the same end of loop functions as described above, but does so within a single instruction cycle. The present invention is conveniently characterized as a branch and add instruction where branching is conditional upon the value of a loop condition code (LCC). In order to execute within a single instruction cycle, the present invention performs two operations in parallel, namely, (i) decrementing and testing of a loop counter and (ii) conditional branching. Since these operations are performed in parallel, it will be evident that branching is actually conditional upon the value of the loop counter during the previous iteration through the loop.

The present invention may be characterized by the following sequence of logical operations, where comp2 designates a function that returns the two's complement of its argument:

(1) LCC temp clear if src2 < comp2(scr1)
(2) LCC temp set if src2 ≧ comp2(src1)
(3) src2←src1+src2
(4) execute one more sequential instruction
(5) IF LCC, THEN LCC←LCC temp and continue execution at conditional branch address, ELSE LCC←LCC temp and continue execution at next address A loop count value is denoted by operand src2 and a value by which the loop count is decremented on each iteration through the loop is denoted by operand src1 in logical operations (1)-(3) above.

Figure 2:
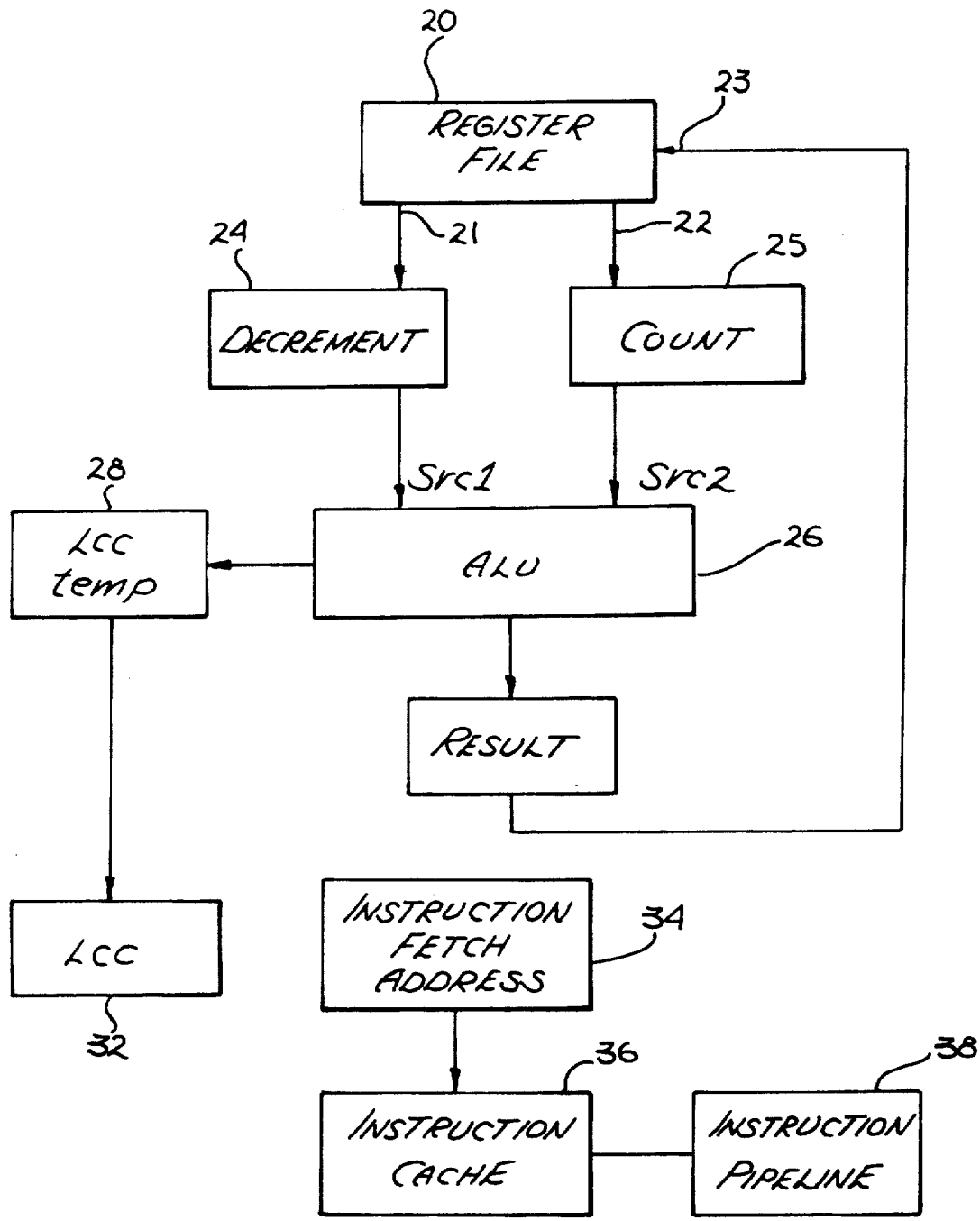
FIG. 2 is a functional block diagram of an apparatus according to the present invention.

Refering now to FIG. 2, a simplified functional block diagram of a system for implementing the present invention is shown. Reference numeral 20 denotes a register file comprising a set, for example 32, of addressable 32-bit registers. Two output ports 21 and 22 and an input port 23 are provided. Output ports 21 and 22 feed 32-bit data words to temporary registers 24 and 25, respectively. Registers 24 and 25, in turn, feed ALU 26. The operands thus provided to ALU 26 correspond to scr1 and scr2 of the notation used in logical operations (1)-(6) above. Accordingly, the loop count value (a positive integer) is retrieved from register file 20 at output pott 22 and the decrement value (a nagative integer) is retrieved at output 21.

ALU 26 performs arithmetic operations on operands src1 and src2 in a generally conventional manner as is well known in the art of data processing devices. In implementing the present invention, ALU 26 adds the integer values of operands src1 and src2 and simultaneously compares the value of src2 with the two's complement of src1. The result of the addition is returned to the same register in register file 20 from which the loop count value was retrieved, thereby storing the decremented loop count for retrieval in the next iteration. The result of the comparison determines the loop condition code, which is temporarily stored in LCC temp register 28.

The value stored in LCC temp register 28 is either a logical one or a logical zero depending upon the result of the comparison performed in ALU 26. If the loop count value is less than the two's complement of the decrement value, LCC temp register 28 is cleared, i.e. reset to a logical zero. If the loop count value is greater than or equal to the two's complement of the decrement value, the LCC temp register 28 is set to a logical one.

As noted above, the loop condition code is temporarily stored in register 28. The register is coupled to LCC register 32 which contains the value for controlling conditional branching. To simplify the present disclosure, LCC register 32 will be treated as a 1-bit register. However, the loop condition code is preferably stored as one bit of a larger processor status register which contains various other supervisory data. It is important tha tthe loop condition code bit be dedicated to the loop control function described herein and not shared by other instructions. For example, if a more general condition code were to be employed for other functions in addition to loop control, any instruction within the loop that sets or clears such condition code would corrupt the operation of the loop.

Register 32 is coupled to instruction fetch address logic 34 which designates the instructions to be loaded from instruction cache 36 into instruction pipeline 38. Depending upon the logical value of the loop condition code in LCC register 32, instruction fetch address logic will load pipeline 38 with either the instruction at the designated branch address, i.e. the first instuction in the loop (when LCC is set) or the next instruction after the loop (when LCC is cleared). In either event, one additional instruction is executed prior to the instruction determined by the conditional branch.

It is to be understood that FIG. 2 presents a functional block diagram of an apparatus for implementing the present invention. It will be appreciated by those skilled in the art that a specific hardware implementation of the apparatus shown in FIG. 2 is a matter of design choice that depends upon many factors generally unrelated to this invention. Accordingly, many circuit elements that would ordinarily be included in a practical processor but which do not relate to the function of the present invention have not been shown for the sake of clarity. While it is possible to implement this invention using discrete electrical components and/or commercially available integrated circuit devices, the most advantageous use of this invention is made in conjunction with a microprocessor chip. In partricular, the present invention is especially useful in reduced instruction set computing (RISC) processor or co-processor optimized for high throughput.

Figure 3:
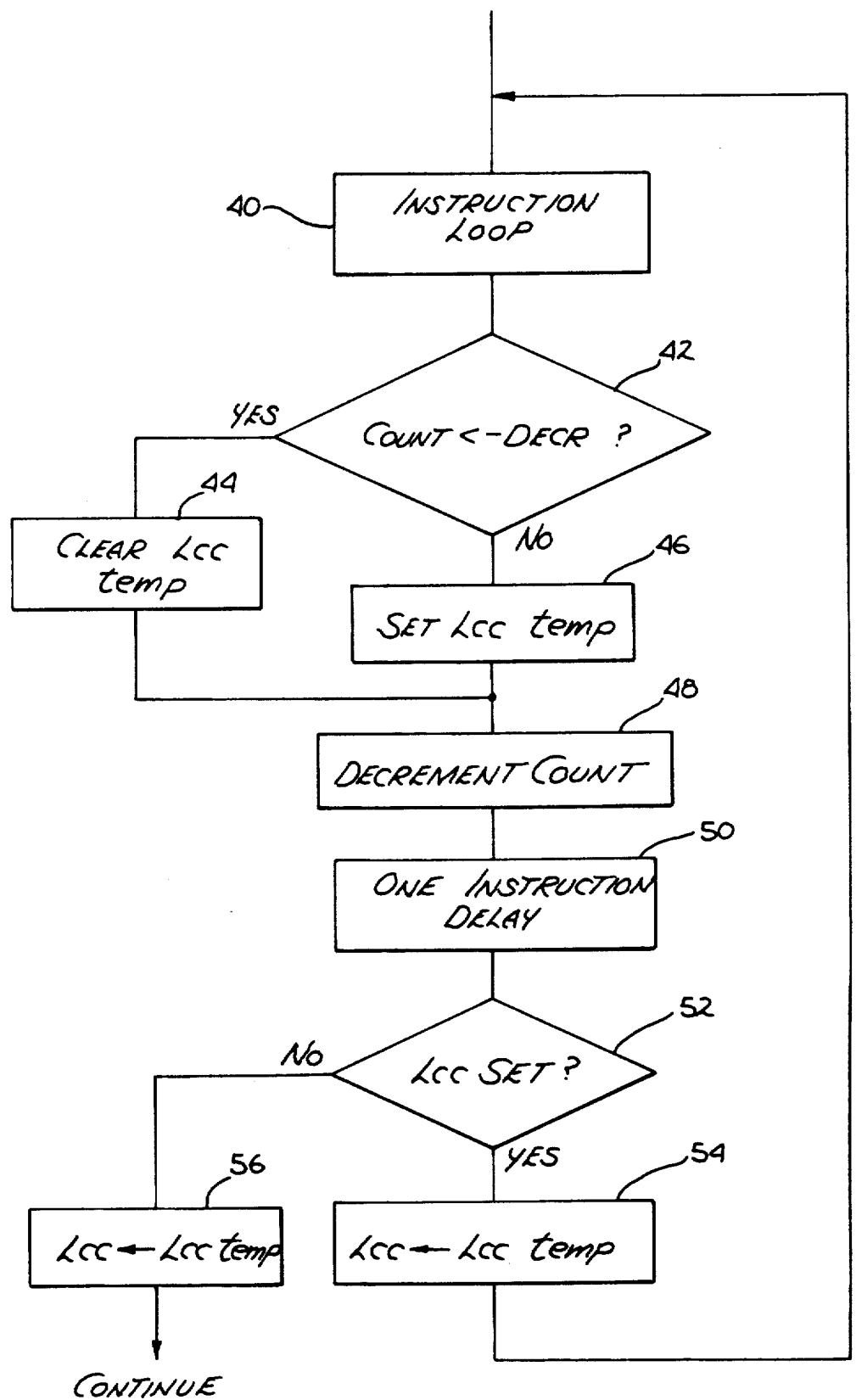
FIG. 3 is a logical flow diagram illustrating the method of program loop control of the present invention.

Referring now to FIG. 3, a logical flow diagram is presented which illustrates operation of the present invention. A set of one or more instructions comprises an instruction loop 40 which is to be preformed iteratively a predetermined number of times. At the end of the instruction loop, the loop count value is compared with the two's complement of the decrement vlue in step 42. If the count value is less than the two's complement of the decrement value, the LCC temp register is cleared in step 44. On the other hand, if the count value is greater than or or equal to the two's complement of the decrement value, the LCC temp register is set in step 46. After either setting or clearing the LCC temp register, the count value is decremented in step 48. Next, at step 50, there is a one instruction delay which allows overlapping execution of the next sequential instruction while instructions are fetched from the the new instructions address. Such a delay avoids breaks in the instruction execution pipeline. It is generally possible to find an appropriate instruction to execute after the delayed control-transfer instruction. Such instruction may be the first instruction of the procedure to which contol is passed or may be the last instruction of the loop.

At step 52, control is transferred based on the contents of the loop condition code. If LCC is set, control is returned to the begining of the instruction loop 40. If LCC is cleared, control passes to the next instruction following the loop. In either case, the LCC register is first loaded with the contents of the LCC temp register.

When implementing a loop counter, the instruction of the present invention may be advantageously performed before the loop is entered in order to initialize the loop condition code. The conditional branch target address of such an instruction should be the sequential instruction after the next (i.e., the second sequential instruction), so that the sequential flow of execution is maintained regardless of the setting of the loop condition code. By designating the same decrement value register (scr1) and count value register (src2) in this initializing instruction as in the branch and add instruction at the end of the loop, the total number of iterations is the value of the loop count before the first branch instruction, plus one.

The present invention has been described in terms of an exemplary application of implementing a loop counter. However, it will be recognized that the present invention is not limited to such an application and may be used in other ways to provide conditional branching in accordance with the sequence of logical operations described above. Furthermore, the above described invention may be embodied in other specific forms without departing from the spirit or essential characteristics of the disclosure. Thus, it is understood that the invention is not to be limited by the foregoing illustrative details, but rather is to be defined by the appended claims.

I claim

1. In a computational apparatus for performing operations in synchronism with a clock signal, a method for performing a sequence of operations comprising the steps of:
    (a) initializing a loop count decrement and a loop condition code;
    (b) performing an iteration of said sequence of operations;
    (c) comparing said loop count with an absolute value of said loop count decrement in an arithmetic logic unit and providing a comparison output from the arithmetic logic unit to a temporary condition code register;
    (d) setting a temporary loop condition code in the temporary loop condition code register if said loop count is not less than said loop count decrement and clearing said temporary loop condition code if said loop count is less than said loop count decrement;
    (e) decreasing said loop count by said count decrement;
    (f) designating as a branch address a first of said sequence of operations if said loop condition code is set and designating as a branch address an operation sequentially following said sequence of operations if said loop condition code is cleared; and
    (g) setting said loop condition code equal to said temporary loop condition code;
    wherein steps (c), (d), (e) and (f) are performed substantially concurrently during a single cycle of said clock signal;
whereby conditional branching is performed based on an initialized value of said loop count for a first iteration of said sequence of operations and is performed based on the value of said loop count in an immediately previous iteration of said sequence of operations in a second and subsequent iterations of said sequence of operations.

2. The method of claim 1 wherein said loop condition code is stored in a dedicated location.

3. The method of claim 1 wherein said loop condition is stored in a dedicated bit of a processor status register.

4. An apparatus for controlling iterative performance of a sequence of operations comprising:
    (a) first register means for storing a loop count;
    (b) second register means for storing a decrement value;
    (c) arithmetic logic means for receiving said loop count and said decrement value and for substantially concurrently decreasing said loop count by said decrement value, comparing said loop count with a two's complement of said decrement value, and providing a loop condition code indicating a result of said comparison;
    (d) third register means coupled to the arithmetic logic means for receiving and temporarily storing said loop condition code;
    (e) fourth register means coupled to said third register means for storing said loop condition code after a predetermined delay time; and
    (f) instruction fetch address means coupled to said fourth register means for designating a branch address based on said loop condition code, said branch address corresponding to a first of said sequence of operations if said loop condition code indicates said loop count is not less than said two's complement of said decrement value and said branch address corresponding to an operation sequentially following said sequence of operations if said loop condition code indicates said loop count is less than said two's complement of said decrement value;

whereby said branch address which is determined substantially concurrently with said comparison performed by said arithmetic logic means is based on a loop condition code set prior to said predetermined delay time.

5. The apparatus of claim 4 wherein said fourth register means comprises a dedicated bit of a processor status register.

6. The apparatus of claim 4 wherein said first and second register means are associated with a register file.

7. The apparatus fo claim 4 wherein said apparatus is included in a single chip microprocessor.

* * * * *

UNITED STATES PATENT AND TRADEMARK OFFICE
CERTIFICATE OF CORRECTION

PATENT NO. : 5,101,484
DATED : March 31, 1992
INVENTOR(S) : Leslie D. Kohn

It is certified that error appears in the above-indentified patent and that said Letters Patent is hereby corrected as shown below:

Col. 4, Line 48    Delete "tha tthe"    Add --that the--

Col. 5, Line 22    Delete "vlue"    Add --value--

Col. 6, Line 7    After the word for please add --iteratively--

Signed and Sealed this

First Day of February, 1994

*Attest:*

BRUCE LEHMAN

*Attesting Officer*    Commissioner of Patents and Trademarks